US011326660B2

(12) United States Patent
Tanoue et al.

(10) Patent No.: US 11,326,660 B2
(45) Date of Patent: May 10, 2022

(54) REACTION FORCE GENERATION UNIT

(71) Applicant: YAMAHA CORPORATION, Hamamatsu (JP)

(72) Inventors: Michiko Tanoue, Hamamatsu (JP); Ichiro Osuga, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 225 days.

(21) Appl. No.: 16/688,214

(22) Filed: Nov. 19, 2019

(65) Prior Publication Data

US 2020/0088258 A1 Mar. 19, 2020

Related U.S. Application Data

(63) Continuation of application No. PCT/JP2017/020297, filed on May 31, 2017.

(51) Int. Cl.
*F16F 1/376* (2006.01)
*G10H 1/34* (2006.01)

(52) U.S. Cl.
CPC .......... *F16F 1/376* (2013.01); *F16F 2230/02* (2013.01); *G10H 1/346* (2013.01)

(58) Field of Classification Search
CPC ........ F16F 1/376; F16F 1/374; F16F 2230/02; F16F 2230/34; F16F 2232/02; G01H 1/346; G10H 2220/285

(Continued)

(56) References Cited

U.S. PATENT DOCUMENTS 3,125,330 A * 3/1964 Dye ..................... F04B 53/145
                                                    267/153
3,845,924 A * 11/1974 Taviere .................. F16F 1/376
                                                    267/153

(Continued)

FOREIGN PATENT DOCUMENTS

DE     112009003605 T5    8/2012
JP       H11213815 A      8/1999

(Continued)

OTHER PUBLICATIONS

International Search Report issued in Intl. Appln. No PCT/JP2017/020297 dated Aug. 15, 2017. English translation provided.

(Continued)

*Primary Examiner* — Thomas J Williams
(74) *Attorney, Agent, or Firm* — Rossi, Kimms & McDowell LLP

(57) ABSTRACT

A reaction force generation unit includes an opposing member and a pressed body, which includes a base and domes, including a first dome, a second dome, and a third dome, bulging from the base. A leading end of each dome faces an opposing surface of the opposing member. When the pressing member presses the base, the leading ends of the domes move in a direction relatively close to the opposing member, where the domes become elastically deformed and cause an appropriate reaction force with respect to the handle. In a natural state where the pressed body is not subjected to any pressing force, axes of the domes are substantially parallel to each other, and acute angles formed by the axes and a normal line of the opposing surface are substantially similar to each other at a predetermined angle larger than zero degree.

8 Claims, 7 Drawing Sheets

(58) Field of Classification Search
USPC .......................................... 267/152, 153, 182
See application file for complete search history.

(56) References Cited

U.S. PATENT DOCUMENTS

| | | | |
|---|---|---|---|
| 6,849,796 B2* | 2/2005 | Yamaguchi | G10H 1/344 84/720 |
| 7,256,359 B2 | 8/2007 | Nishida | |
| 8,748,725 B2* | 6/2014 | Iwase | G10H 1/346 84/745 |
| 2003/0131720 A1* | 7/2003 | Sakurada | G10H 1/346 84/719 |
| 2007/0039452 A1* | 2/2007 | Nishida | G10H 1/344 84/658 |
| 2015/0220105 A1* | 8/2015 | Harimoto | H01H 13/705 200/239 |
| 2018/0204554 A1 | 7/2018 | Harimoto | |

FOREIGN PATENT DOCUMENTS

| | | | | |
|---|---|---|---|---|
| JP | 2007025576 A | | 2/2007 | |
| JP | 2011107296 A | * | 6/2011 | |
| JP | 2015068969 A | | 4/2015 | |
| JP | 2015138659 A | * | 7/2015 | ............. G10H 1/346 |
| JP | 2017045525 A | | 3/2017 | |
| WO | 2015190177 A1 | | 12/2015 | |

OTHER PUBLICATIONS

Written Opinion issued in Intl. Appln. No. PCT/JP2017/020297 dated Aug. 15, 2017.

Office Action issued in German Patent Appln No. 112017007605.6 dated Jan. 28, 2022. English translation provided.

* cited by examiner

REACTION FORCE GENERATION UNIT

TECHNICAL FIELD

The present invention relates to a reaction force generation unit which generates a reaction force when pressed and elastically deformed by an operation of a handle.

DESCRIPTION OF THE RELATED ART

Conventionally, there is known a reaction force generation unit which generates a reaction force when pressed and elastically deformed by an operation of a handle. For example, in the field of electronic keyboard instruments, there is known a musical instrument provided with a switch that includes a dome bulging toward a board surface inside an elastic bulging portion bulging from the board surface and that is elastically deformed when pressed by a member such as a key (Japanese Laid-open Patent Publication (Kokai) No. 2007-25576). In this type of musical instrument, the elastic deformation of the dome or the like generates a reaction force substantially against a key. The musical instrument disclosed in Japanese Laid-open Patent Publication (Kokai) No. 2007-25576 is provided with a plurality of domes which is pressed by a key that is a common pressing member.

In many units, a press stroke by a pressing member causes the dome to move, for example, rotate. In such units, an axial inclination of the dome relative to a normal direction of a board surface changes every moment. When a leading end of the dome contacts (lands on) an opposing surface such as the board surface that is to come into contact with the dome, if an axial inclination of the dome relative to a normal direction of the opposing surface is too large, the landing behavior becomes unstable. The unstable landing behavior causes instability in the magnitude of a reaction force and the timing of generation of a reaction force, which deteriorates durability.

In a device provided with a plurality of domes which is pressed by a common pressing member, it is ideal that an axial inclination of each dome relative to a normal direction of an opposing surface is at a desired angle when a leading end of each dome contacts the opposing surface. In order to be that, it is ideal to set the axial inclination for each dome. It should be noted that there is known a reaction force generation unit provided with a dome having an axial direction inclined relative to a normal direction of an opposing surface while the dome is not pressed (Japanese Laid-open Patent Publication (Kokai) No. 2015-68969).

However, in a device provided with a plurality of domes which is pressed by a common pressing member, if the domes subjected to no pressing force are designed to have different axial inclinations, the processing of a reaction force generation unit becomes difficult, which creates a hurdle to yield a product with high accuracy. In other words, this type of reaction force generation unit is typically manufactured by filling a mold with an elastic material. Usually, a direction in which a mold is drawn agrees with an axial direction of a dome. Accordingly, it is not easy to mold a reaction force generation unit provided with a plurality of domes having different axial directions in an integrated manner and with a high degree of accuracy. It should be noted that the use of a slide mold is not realistic, since a slide mold increases in cost and decreases in accuracy.

SUMMARY OF THE INVENTION

An object of the present invention is to provide a reaction force generation unit which stabilizes a reaction force to be generated and enhances processing accuracy.

According to the present invention, in order to achieve the object, there is provided a reaction force generation unit including: an opposing member (10); and a pressed body (20) formed of an elastic material and including: a base (21); a skirt (24) connected to and extending from the base toward the opposing member; and a plurality of domes (22) bulging from the base toward the opposing member, each of the plurality of domes including a surface disposed closest to the opposing member that are substantially parallel and spaced at different distances from the opposing member, wherein, in a natural state where the base is not subjected to any pressing force: axes (X1, X2, X3) of the plurality of domes are substantially parallel to each other; and each of the axes and a normal line (X0) of an opposing surface of the opposing member that faces the domes form a predetermined angle ($\theta 0$) larger than zero degree.

It should be noted that the reference numerals in the above parenthesis are examples.

Further features of the present invention will become apparent from the following description of exemplary embodiments with reference to the attached drawings.

DESCRIPTION OF THE EMBODIMENT

An embodiment of the present invention will now be described with reference to the drawings.

Figure 1:
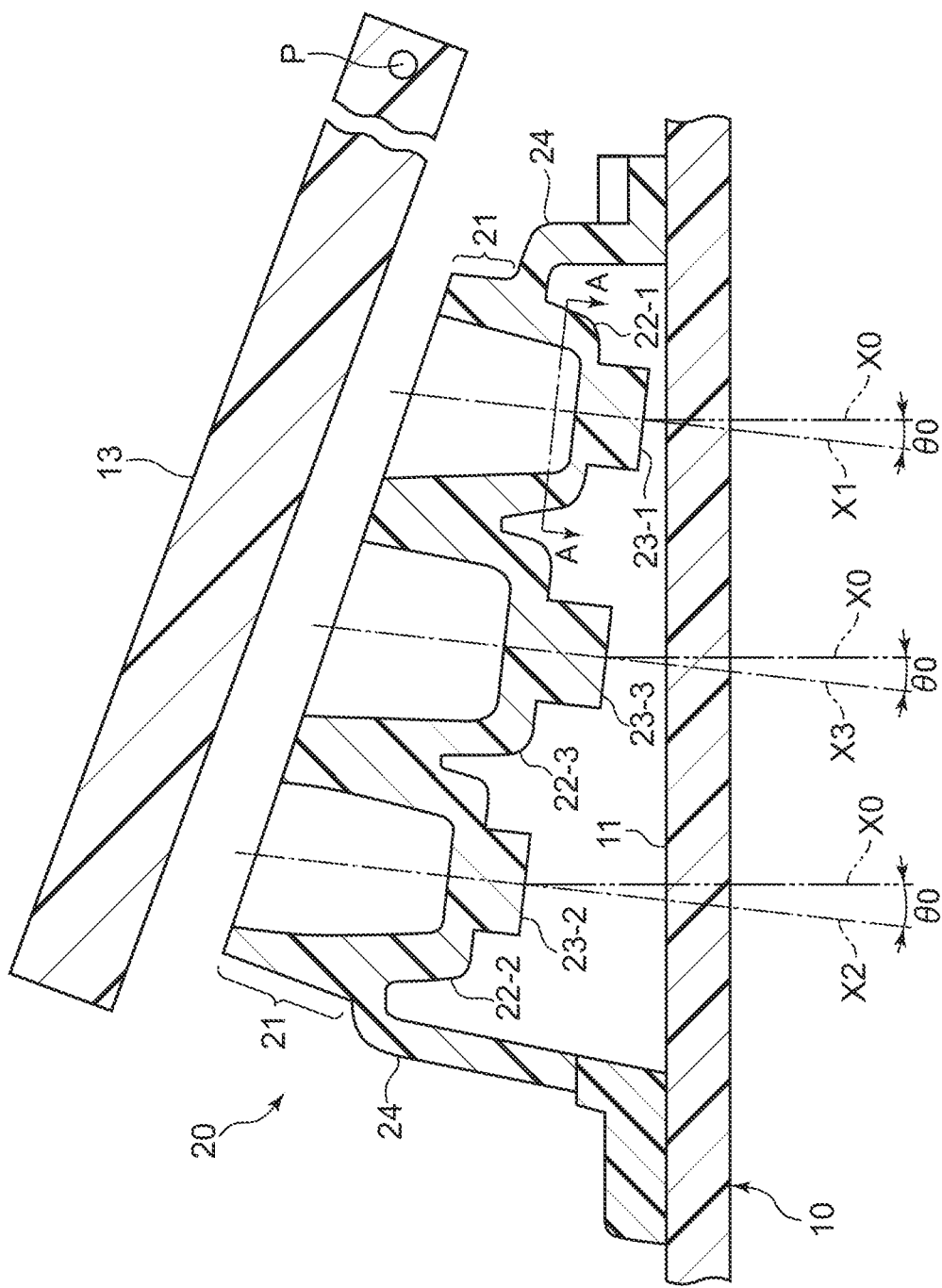
FIG. 1 is a schematic cross-sectional view showing a configuration of a reaction force generation device (reaction force generation unit).
Figure 2:
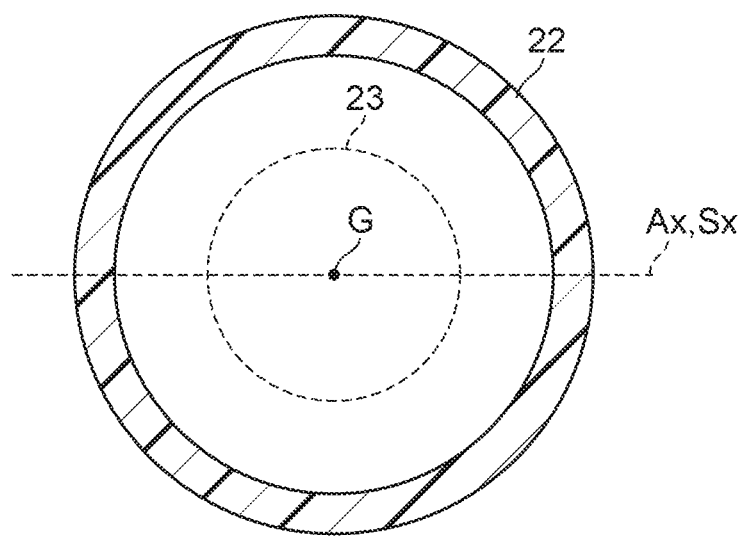
FIG. 2 is a cross-sectional view taken along the line A-A of FIG. 1.

FIG. 1 is a schematic cross-sectional view showing a configuration of a reaction force generation device (reaction force generation unit) according to an embodiment of the present invention. FIG. 2 is a cross-sectional view taken along the line A-A of FIG. 1. This reaction force generation device includes at least a pressed body 20 and an opposing member 10. The pressed body 20 is formed of an elastic material in an integrated manner, being disposed on the opposing member 10. An elastic skirt 24 bulges on the opposing member 10, and a base 21 is connected to the skirt 24. A pressing member 13, for example, rotates about a pivot P or moves along with rotation. The pressing member 13 may be a handle itself. Alternatively, the pressing member 13 may be a moving member that moves by an operation of a handle. The opposing member 10 is, for example, a member that does not move, but the present invention is not limited thereto. At least one of the opposing member 10 and the pressing member 13 may move so as to press the pressed body 20 in cooperation.

The pressed body 20 is formed in an integrated manner by, for example, filling a mold with an elastic material. On the inner side of the skirt 24 which is an outer dome, a plurality of (three) domes, that is, a first dome 22-1, a second dome 22-2, and a third dome 22-3, bulges from the base 21 toward the opposing member 10. The domes 22-1, 22-3, and 22-2 are arranged in a straight line in this order. Each dome 22 has a leading end 23 (23-1, 23-2, and 23-3). Hereinafter, when the three domes 22 and the leading ends 23 are not distinguished from each other, those members are simply referred to as the dome(s) 22 and the leading end(s) 23. When the base 21 is pressed by the pressing member 13, the leading ends 23 of the domes 22 move in a direction relatively close to the opposing member 10. At this time, the domes 22 are elastically deformed and cause an appropriate reaction force with respect to the handle. The shape of the leading ends 23 (the shape of leading end surfaces) is, for example, substantially circular and flat (see FIG. 2). The opposing member 10 has an opposing surface 11 that faces the leading end 23 of each dome 22.

FIG. 1 shows a non-operating state of the handle. In the non-operating state, the pressing member 13 does not start to move, and the pressed body 20 is in a free state, being subjected to no pressing load. The pressing member 13 may be configured to contact the pressed body 20 in advance. Assuming such a configuration, a state where the pressed body 20 is assumed to be subjected to no pressing force is referred to as "natural state." When the handle, the pressing member 13, or a member interposed between the handle and the pressing member 13 comes into contact with a stopper or the like, the movement of the pressing member 13 is regulated at a moving end position.

This embodiment illustrates a case where each dome 22 bulges in a slightly oblique direction relative to a normal line X0 of the opposing surface 11 of the opposing member 10. Each of the domes 22 has a similar cross-sectional shape. The domes 22-1, 22-2, and 22-3 substantially bulge in directions accord with axes X1, X2, and X3 of the domes 22, respectively. Specifically, the axes X1, X2, and X3 are straight lines respectively passing through centroids G of the corresponding leading ends 23. The domes 22 have cross-sectional shapes relative to a perpendicular plane that are similar to each other at any position within a predetermined range of the straight lines. The cross-sectional shapes of the domes 22 respectively perpendicular to the axes X1, X2, and X3 are substantially line-symmetric, and are circular (annular) shapes as exemplified in FIG. 1. An imaginary plane including a symmetry axis Ax related to the line-symmetry and the axes X1, X2, and X3 is defined as Sx. The three-dimensional shape of each dome 22 is substantially symmetric with respect to the imaginary plane Sx.

The first dome 22-1 will be described as an example. In the non-operating state of the handle and the natural state of the pressed body 20 shown in FIG. 1, an acute angle formed by the axis X1 of the first dome 22-1 and the normal line X0 of the opposing surface 11 is a predetermined angle θ0 larger than zero degree. The axes X1, X2, and X3 are substantially parallel to each other, and acute angles formed by the axes X1, X2, and X3 and the normal line X0 of the opposing surface 11 are substantially similar to each other at the predetermined angle θ0.

A stroke where the opposing member 10 and the base 21 come relatively close to each other from the non-operating state by the operation of the handle is a press stroke. When the movement of the pressing member 13 is regulated at the moving end position, the pressing member 13 is brought to a pressing end state. Accordingly, the press stroke is a stroke where the pressed body 20 transits, based on the movement of the handle, from the natural state to the pressing end state corresponding to a maximum range of movement relative to the opposing surface 11. When the pressing by the opposing member 10 is released, the pressed body 20 returns to the initial state (the free state in the example shown in FIG. 1) due to elasticity. In the press stroke, each dome 22 deforms, but the imaginary plane Sx does not change. Accordingly, the imaginary plane Sx is substantially parallel to the normal line X0 on a constant basis.

Figure 3:
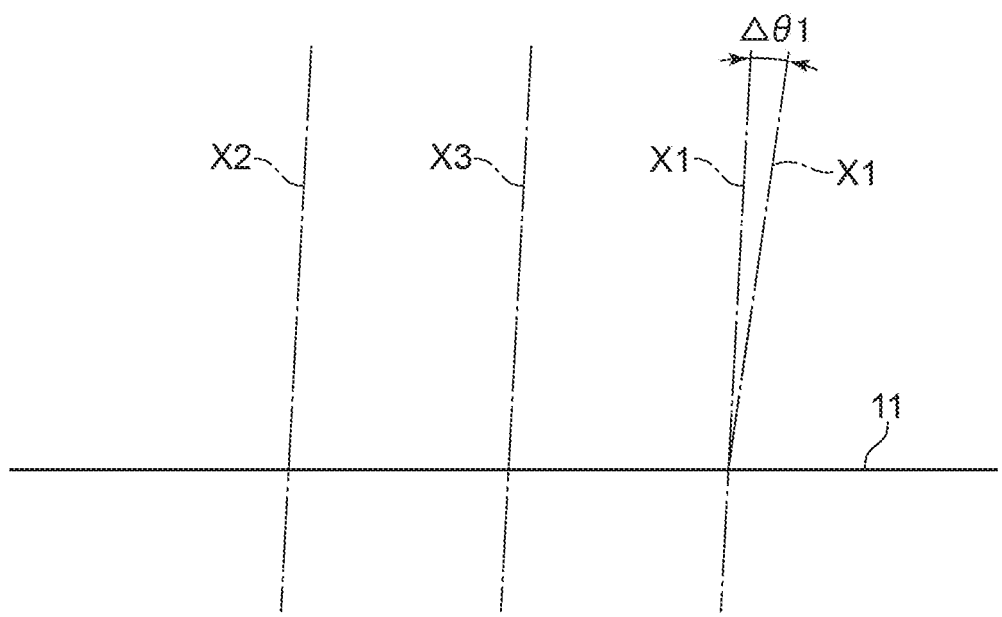
FIG. 3 is a schematic view showing a relation between an axis and a normal line at the moment when a leading end comes into contact with an opposing surface in a press stroke.
Figure 4:
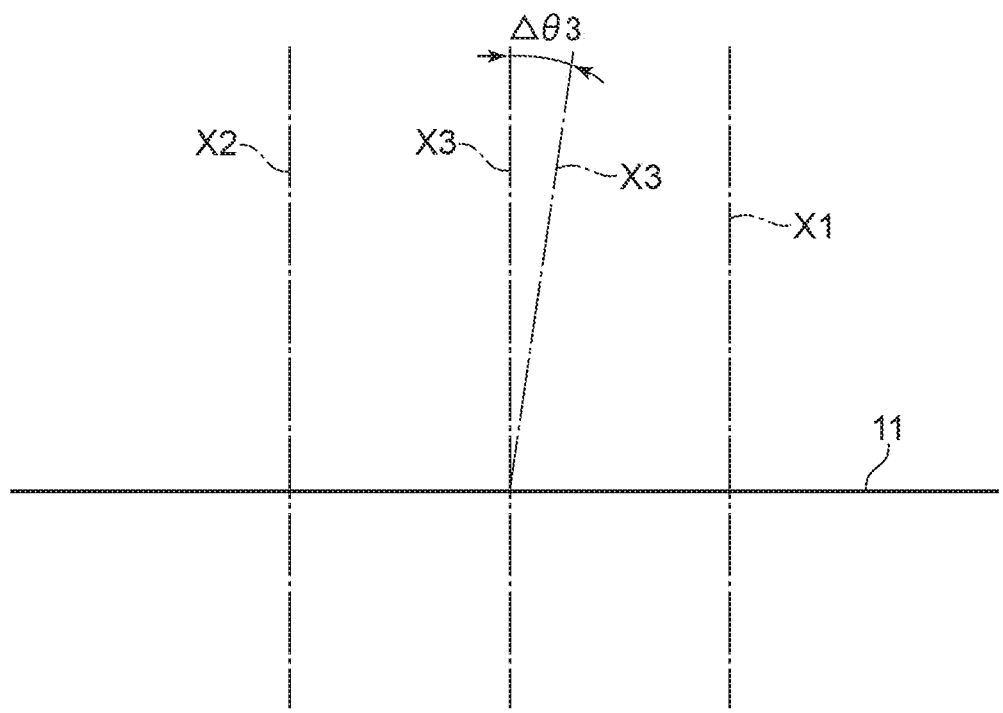
FIG. 4 is a schematic view showing a relation between an axis and the normal line at the moment when a leading end comes into contact with the opposing surface in the press stroke.
Figure 5:
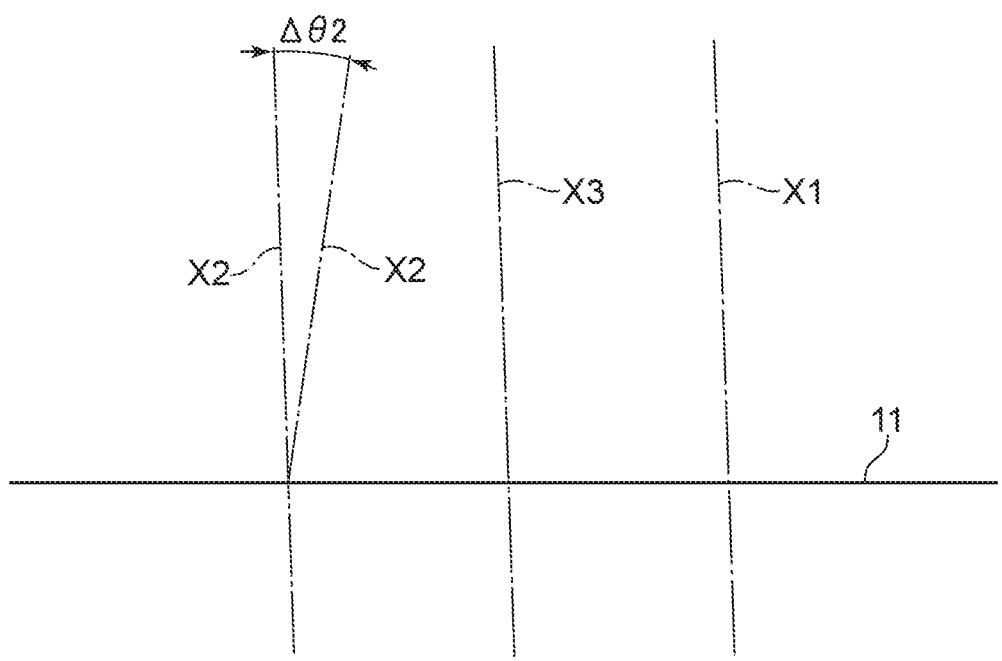
FIG. 5 is a schematic view showing a relation between an axis and the normal line at the moment when a leading end comes into contact with the opposing surface in the press stroke.

FIGS. 3, 4, and 5 are schematic views respectively showing a relation between the axes X1, X2, and X3 and the normal line X0 at the moment when the leading ends 23-1, 23-3, and 23-2 contact the opposing surface 11 in the press stroke. In the press stroke, the leading ends 23-1, 23-3, and 23-2 contact the opposing surface 11 in this order. In the press stroke, each dome 22 moves rotationally, and an axial inclination of each dome 22 relative to the normal direction of the opposing surface 11 changes every moment. Technically, angles formed by the axes X1, X2, and X3 and the normal line X0 are considered on the imaginary plane Sx.

First, an angular shift of the axis X1 relative to the normal line X0 until the leading end 23-1 of the first dome 22-1 starts to contact the opposing surface 11 with reference to the natural state is regarded as an angular shift Δθ1 (first angular shift) (FIG. 3). From the non-operating state to this point, none of the axes X1, X2, and X3 are parallel to the normal line X0. Furthermore, an angular shift of the axis X3 relative to the normal line X0 until the leading end 23-3 of the third dome 22-3 starts to contact the opposing surface 11 with reference to the natural state is regarded as an angular shift Δθ3 (FIG. 4). At this point, the axis X3 is substantially parallel to the normal line X0. In other words, the axis X3 is substantially perpendicular to the opposing surface 11 when the leading end 23-3 starts to contact the opposing surface 11 in the press stroke (the predetermined angle θ0 is set in such a manner). Still further, an angular shift of the axis X2 relative to the normal line X0 until the leading end 23-2 of the second dome 22-2 starts to contact the opposing surface 11 with reference to the natural state is regarded as an angular shift Δθ2 (second angular shift) (FIG. 5). By this point, the axis X2 goes through a state to be parallel to the normal line X0. The magnitude relation of the angular shift is Δθ1<Δθ3<Δθ2.

Here, when the leading ends 23 of the domes 22 contact (land on) the opposing surface 11, if an axial inclination of each dome relative to the normal direction of the opposing surface 11 is too large, the landing behavior becomes unstable. However, in particular, since the leading end 23-3 of the third dome 22-3 which is in the middle of the arrangement direction is substantially perpendicular to the opposing surface 11 when the third dome 22-3 starts to contact the opposing surface 11, the contact behavior of the third dome 22-3 is stable. The stable contact behavior stabilizes the magnitude of a reaction force and the timing of generation of a reaction force generated by the third dome 22-3, leading to enhanced durability. The predetermined angle θ0 is set to a value obtained by proportionally dividing the angular shift Δθ1 and the angular shift Δθ2. As an example, a value obtained by halving the both angles is regarded as the predetermined angle θ0: the predetermined angle θ0=(Δθ1+Δθ2)/2. Accordingly, it is possible to avoid an excessive unilateral axial inclination of either the first dome 22-1 or the second dome 22-2 when the first dome 22-1 or the second dome 22-2 contacts the opposing surface 11. Therefore, it is possible to balance the magnitude of reaction forces and to stabilize the timing of generation of reaction forces between the domes 22-1 and 22-2, causing the pressed body 20 as a whole to generate a reaction force appropriately. In the example shown in FIG. 1, since the leading end 23-3 is substantially perpendicular to the opposing surface 11 when the leading end 23-3 starts to contact the opposing surface 11, the angular shift Δθ3 is substantially equal to the predetermined angle θ0.

In the natural state, the axes X1, X2, and X3 of the domes 22 are substantially parallel to each other. Accordingly, in forming the domes 22 by molds, the molds corresponding to the domes 22 are drawn in directions substantially equal to the axes X1, X2, and X3, which facilitates the molding of the pressed body 20. With high accuracy assured, it is possible to enhance processing accuracy.

The axes X1, X2, and X3 herein are described as being "substantially parallel" to each other. Note that the "substantially parallel" range includes differences caused by molding circumstances due to molds as well as manufacturing errors. In other words, when the pressed body 20 is formed with a mold, the mold may be provided with a draft angle. Provided that the domes 22 each have a draft angle arranged at different locations, or that the domes 22 each have a draft angle arranged at the same location but at different angles. When each dome 22 is viewed as a single body, such arrangements may yield a dome 22 having an axis that does not agree with a direction in which a mold is drawn. In that case, technically, the domes 22 may have an axis slightly non-parallel to each other. However, in this embodiment, a difference between the axes resulting from the setting of draft angles is regarded as agreement (substantial parallelism).

According to this embodiment, in the natural state, the axes X1, X2, and X3 of the domes 22 are substantially parallel to each other, and the axes X1, X2, and X3 and the normal line X0 of the opposing surface 11 form the predetermined angle θ0 larger than zero degree. Such an arrangement enables stabilization of a reaction force to be generated and enhances processing accuracy. Furthermore, since the axes X1, X2, and X3 are substantially parallel to each other, an interval between the adjacent domes 22 is reduced, which contributes to size reduction.

The predetermined angle θ0 is set to an angle obtained by proportionally dividing the angular shift Δθ1 and the angular shift Δθ2. Therefore, it is possible to balance the magnitude of reaction forces and the timing of generation of reaction forces between the domes 22-1 and 22-2 which are brought into contact with the opposing surface 11 first and last, respectively, in the press stroke. In addition, the leading end 23-3 of the third dome 22-3 is substantially perpendicular to the opposing surface 11 at the start of contact with the opposing surface 11. Therefore, it is possible to stabilize the contact behavior of the third dome 22-3 and to stabilize the magnitude of a reaction force and the timing of generation of a reaction force generated by the third dome 22-3.

Figure 6A:
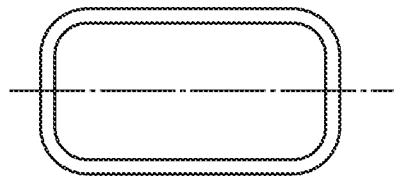
FIG. 6A is a view showing a variation of a cross-sectional shape of a dome.
Figure 6B:
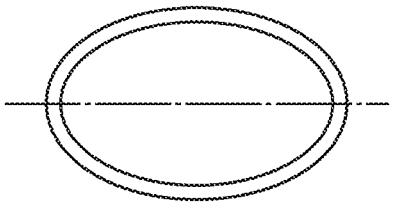
FIG. 6B is a view showing a variation of the cross-sectional shape of the dome.
Figure 6C:
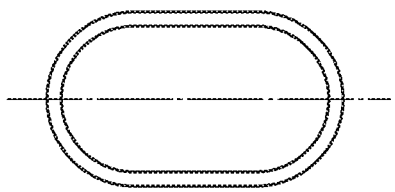
FIG. 6C is a view showing a variation of the cross-sectional shape of the dome.
Figure 6D:
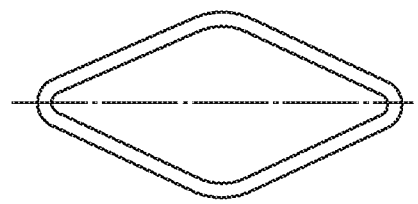
FIG. 6D is a view showing a variation of the cross-sectional shape of the dome.
Figure 6E:
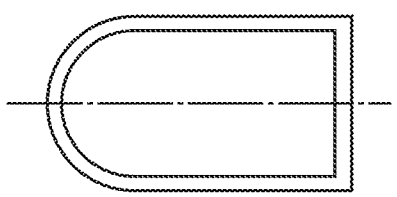
FIG. 6E is a view showing a variation of the cross-sectional shape of the dome.

In this embodiment, the cross-sectional shapes of the domes 22 perpendicular to the axes X1, X2, and X3 are circular. However, as shown in FIGS. 6A to 6E, each dome 22 perpendicular to the corresponding axis may have a substantially line-symmetric cross-sectional shape. In other words, each dome 22 may have any shape such as a rectangle with rounded corners (FIG. 6A), an ellipse (FIG. 6B), an annular shape with straight parts (FIG. 6C), a rhombus with rounded corners (FIG. 6D), and an odd shape with straight parts and a semicircular part (FIG. 6E).

When the leading end 23 of each dome 22 starts to contact the opposing surface 11, each leading end 23 and the opposing surface 11 become substantially parallel to each other, but it should be noted that such a condition is not always required. Each leading end 23 may have an inclination relative to the opposing surface 11 at the start of contact. Furthermore, the leading end 23 of each dome 22 herein is a flat surface, but such a condition is not always required. In a case where each leading end 23 is not flat, the centroid G is identified by a projection geometry of the leading end 23 in a direction in which each dome 22 substantially bulges. It should be noted that each angle mentioned above is not limited to the illustrated value.

The number of the domes 22 in this embodiment is three, but may be four or more as long as there are two or more domes. The predetermined angle θ0 may be set to an angle obtained by proportionally dividing angular shifts of axes relative to the normal line X0 that are related to any pair of the plurality of the domes 22. The angular shifts herein are from the natural state as a reference to a state where the leading ends 23 start to contact the opposing surface 11. In particular, when there are three or more domes 22, domes 22 that contact the opposing surface 11 first and last in the press stroke are regarded as a pair, and a predetermined angle θ0 is set to an angle obtained by proportionally dividing angular shifts related to those two domes 22 so as to easily assure the balance among all the domes 22. It should be noted that a ratio of the proportional division is not limited to one-half, and any ratio is employable.

In the press stroke herein, at the start of contact between the leading ends 23 and the opposing surface 11, the axis X3 of the third dome 22-3 that secondarily comes into contact with the opposing surface 11 is substantially perpendicular to the opposing surface 11. However, a dome 22 having an axis perpendicular to the opposing surface 11 is not limited to the third dome 22-3. In other words, the axis of any one of the plurality of the domes 22 (for example, the dome 22-1 or the dome 22-2) may be substantially perpendicular to the opposing surface 11.

If a dome 22 having an axis substantially perpendicular to the opposing surface 11 at the start of contact between the leading ends 23 and the opposing surface 11 in the press stroke is a dome 22 other than the one that contacts the opposing surface 11 first or last in the press stroke (a dome 22 that does not contact the opposing surface 11 first or last), it is easy to balance the magnitude of reaction forces and to stabilize the timing of generation of reaction forces between the plurality of the domes 22. Note that it is not always necessary to provide a dome 22 having an axis substantially perpendicular to the opposing surface 11 when the leading ends 23 starts to contact the opposing surface 11. The order in which each dome 22 contacts the opposing surface 11 is not limited to the illustrated example. Regardless of the alignment order, any dome 22 may contact the opposing surface 11 first or last.

Figure 7:
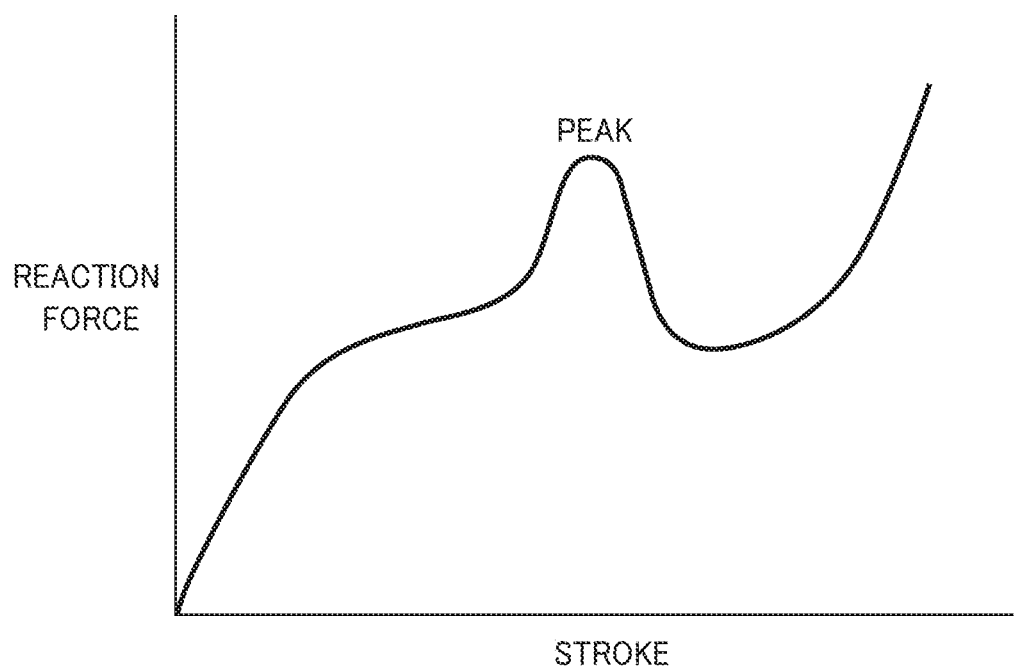
FIG. 7 is a view showing a relation between a press stroke and a reaction force.

In the press stroke, when any one of dome 22 of the plurality of the domes 22 generates a peak reaction force, the axis of any one of the domes 22 may be substantially perpendicular to the opposing surface 11. As illustrated in FIG. 7, in the press stroke, a certain dome 22 generates a peak reaction force in a stroke after coming into contact with the opposing surface 11. It should be noted that a peak reaction force is the maximum of a reaction force before the pressing end state. To make an axis substantially perpendicular to the opposing surface 11 when generating a peak reaction force, the axis should not be perpendicular to the opposing surface 11 until the leading ends 23 start to contact the opposing surface (for example, the axis X1 of the first dome 22-1 shown in FIG. 3). With such a configuration, any one of the domes 22 is less likely to generate a component force when a peak reaction force is generated, which efficiently generates a stable reaction force. Accordingly, generation of a load and assured stability of a posture enables generation of a desired reaction force at a desired timing, leading to enhancement in durability.

The base 21 and the pressing member 13 may come into contact (the contact herein includes slight pressure) with each other in advance when the handle is in the non-operating state. However, even in that case, the "free state" of the pressed body 20 represents a state where the pressed body 20 is disposed on some kind of device but not in contact with the pressing member 13.

The reaction force generation device of the present invention may be applied to a keyboard device or a musical instrument. In a case where the reaction force generation device is applied to a keyboard instrument, the opposing member 10 or the pressing member 13 may be either a key of the keyboard or a member that moves along with the movement of the key. An example of such a member includes a hammer that provides inertia to a key pressing operation.

The reaction force generation device is also employable as a switch device that detects pressing and releasing operations of a handle such as a key and is applicable to, for example, a keyboard instrument. In that case, for example, the opposing member 10 serves as a board, and a fixed contact is arranged on the opposing surface 11. At the same time, a moving contact is arranged on the leading end 23 of each dome 22. The pressing and releasing operations of the key may be detected when the fixed contact and the moving contact come into contact with each other. The velocity of key pressing and key releasing operations or the timing of sound emitting and muting may be determined based on detection results of the contact behavior by the plurality of the domes 22. When the reaction force generation device is configured as such a switch device, the contact behavior is stabilized due to a stable landing behavior of the leading end 23 of each dome 22, which enables highly accurate detection and contributes to chattering prevention.

In a keyboard device, when a stopper includes a soft material, even though the pressing member 13 or a member interposed between the handle and the pressing member 13 comes into contact with the stopper or the like, the pressing member 13 does not stop immediately but moves slightly due to inertia. Stabilization of a reaction force generated between the time when the pressing member 13 contacts the stopper and the time when the pressing member 13 and the pressed body 20 actually stop provides an appropriate initial velocity to the pressing member 13 to return, which brings advantage of improving a repetitive-striking performance. Reaction forces of the domes 22, the skirt 24, and the stopper offer an initial velocity to the pressing member 13 (or the handle) at an initial stage of the return and contribute to improvement in repetitive-striking performance. Among these members, stabilization of reaction forces generated by the domes 22 and the skirt 24 generates a stable initial velocity of the return with respect to the pressing member 13 (or the handle). Since the return of the pressing member 13 becomes fast, it is possible to press the next key immediately, leading to an improvement in repetitive-striking performance. If each of the plurality of the domes 22 functions as a switch, from a viewpoint of improving the repetitive-striking performance, the pressing member 13 is configured to return at least to a position of the switch arranged last in the forward stroke due to the initial velocity given at the initial stage of the return.

Although the present invention is described in detail based on preferred embodiments, the present invention is not limited to the specific embodiments. The present invention includes various aspects within the scope of the present invention.

This application is a bypass continuation application of PCT International Application PCT/JP2017/020297, filed on May 31, 2017, the entire contents of which are incorporated herein by reference.

What is claimed is:

1. A reaction force generation unit comprising:
an opposing member; and
a pressed body formed of an elastic material and including:
    a base;
    a skirt connected to and extending from the base toward the opposing member; and
    a plurality of domes bulging from the base toward the opposing member, each of the plurality of domes, including a surface disposed closest to the opposing member, that are substantially parallel to each other and spaced at different distances from the opposing member,
wherein, in a natural state where the base is not subjected to any pressing force:
    axes of the plurality of domes are substantially parallel to each other; and
    each of the axes and a normal line of an opposing surface of the opposing member that faces the domes form a predetermined angle larger than zero degree.

2. The reaction force generation unit according to claim 1, wherein the predetermined angle is set to an angle obtained by proportionally dividing:
    a first angular shift of an axis of a first dome relative to the normal line of the opposing surface until a leading end of the first dome of the plurality of the domes starts to contact the opposing surface with reference to the natural state during a press stroke where the base is pressed; and
    a second angular shift of an axis of a second dome relative to the normal line of the opposing surface until a leading end of the second dome of the plurality of the domes starts to contact the opposing surface with reference to the natural state during the press stroke.

3. The reaction force generation unit according to claim 1, wherein the predetermined angle is set so that an axis of any one of the plurality of the domes becomes substantially perpendicular to the opposing surface upon a leading end of the one of the plurality of the domes starting to contact the opposing surface during a press stroke where the base is pressed.

4. The reaction force generation unit according to claim 1, wherein the predetermined angle is set so that an axis of any one of the plurality of the domes is substantially perpendicular to the opposing surface upon the one of the plurality of the domes generating a peak reaction force during a press stroke where the base is pressed.

5. The reaction force generation unit according to claim 2, wherein:
the plurality of the domes are configured to contact the opposing surface in sequence during the press stroke, and
the first dome contacts the opposing surface first and the second dome contacts the opposing surface last during the press stroke.

6. The reaction force generation unit according to claim 3, wherein:
the plurality of the domes contact the opposing surface in sequence during the press stroke, and
the one of the plurality of the domes is a dome other than a dome that contacts the opposing surface first or last during the press stroke.

7. The reaction force generation unit according to claim 1, wherein:
the plurality of the domes have a substantially symmetrical three-dimensional shape relative to an imaginary plane including a symmetry axis and the axes, and
the imaginary plane does not change during the press stroke.

8. The reaction force generation unit according to claim 1, wherein the axes of the domes are straight lines respectively passing through centroids of leading ends of corresponding domes and the corresponding domes have cross-sectional shapes relative to a perpendicular plane that are similar to each other at any position within a predetermined range of the straight lines.

\* \* \* \* \*